(12) United States Patent
Ovetchkine et al.

(10) Patent No.: US 7,516,400 B2
(45) Date of Patent: Apr. 7, 2009

(54) LAYOUT SYSTEM FOR CONSISTENT USER INTERFACE RESULTS

(75) Inventors: Oleg V. Ovetchkine, Bellevue, WA (US); Dmitry G. Titov, Redmond, WA (US); Gregory A. Lett, Redmond, WA (US); Henry D. Hahn, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

(21) Appl. No.: 11/074,476

(22) Filed: Mar. 7, 2005

(65) Prior Publication Data

US 2006/0218489 A1    Sep. 28, 2006

(51) Int. Cl.
*G06N 3/00* (2006.01)
(52) U.S. Cl. ...................................... 715/234
(58) Field of Classification Search ................. 715/513, 715/517, 523, 530, 234, 244, 254
See application file for complete search history.

(56) References Cited

U.S. PATENT DOCUMENTS 5,521,658 A * 5/1996 Donohoe ..................... 353/98
6,272,672 B1 * 8/2001 Conway ....................... 717/107
6,745,163 B1 * 6/2004 Brocious et al. ............. 704/260
7,020,690 B1 * 3/2006 Haitsuka et al. ............. 709/217
7,185,274 B1 * 2/2007 Rubin et al. ................. 715/513
7,412,644 B2 * 8/2008 Kieffer ......................... 715/200
2002/0016801 A1 * 2/2002 Reiley et al. ................. 707/523

\* cited by examiner

*Primary Examiner*—Stephen S Hong
*Assistant Examiner*—Kyle R Stork
(74) *Attorney, Agent, or Firm*—Workman Nydegger

(57) ABSTRACT

Described is a layout system and process for user interface elements of computer programs. The layout system generally refers to a protocol and associated API that enables sizes and positions to be allotted, in which user interface elements are rendered. The layout system may be split between a core layout system and a framework layout system. The core provides minimal policy/rules that are imposed to allow flexibility for a given framework implementation. The framework adds support for user-specified sizing, positioning, margins, minimum sizes, maximum sizes and specific layout elements. Parent elements (e.g., containers) direct measure calls and arrange calls to child elements. The layout system essentially intercepts those calls and depending on policy may manipulate the properties of those calls for sizing, positioning, alignment and the like to ensure uniform and consistent layout results.

19 Claims, 8 Drawing Sheets

LAYOUT SYSTEM FOR CONSISTENT USER INTERFACE RESULTS

FIELD OF THE INVENTION

The invention relates generally to computer systems, and more particularly to the processing of graphical and other video information for display on computer systems.

BACKGROUND

The term "layout" in user interface application platforms refers to the sizes and positions of user interface elements, such as text boxes, buttons, image boxes, and so forth. Layout has traditionally been a very difficult problem to solve in terms of the balance between power and simplicity. Typically, the more powerful a layout system, the more complex it needs to be. However, as the complexity of the system increases, so does the investment a developer has to make in becoming educated as to the behavior of the system. The cost of the investment can be prohibitive, whereby a developer may settle for a simpler but less powerful layout solution.

For example, layout needs logic to handle dynamic changes. Consider that as an application window is resized, the sizes and positions of at least some user interface elements within that window need to change, or be removed or added back. Less dynamic, but still variable changes occur when the user interface language is changed as part of globalizing a program. What may be a short string on an element in one language may be a long string when translated to another language.

Even when dealing with the same language, another example of a significant problem of user interface is that the sizes of user interface elements are not always known ahead of time. Text and other content that needs to be displayed can be obtained dynamically, and thus may be variable in size. If a user interface element needs more space than can be provided, existing layout systems are not consistent with respect to handling such constraints.

In general, simple layout systems are not always able to properly deal with changes to user interface elements. At the same time, complex layout systems that are better able to handle the dynamic nature of user interface layout are difficult to implement. What is needed is a layout system and method that is consistent and uniform in handling user interface elements. Such a layout system should be straightforward for developers to use, and extensible to handle other layout needs as they arise.

SUMMARY OF THE INVENTION

Briefly, the present invention is directed towards a system and method by which a layout system comprising a protocol and associated API manages sizes and positions for user interface elements to render content. When parent elements (e.g., containers) direct measure calls and arrange calls to children elements, to determine the children's desired sizes and then configure the layout, respectively, the layout system essentially intercepts those calls, and depending on policy may manipulate the properties of those calls to control sizing, positioning, alignment, flow direction and so forth to ensure uniform and consistent layout results.

In general, a developer provides code (e.g., markup of a suitable markup language) to cause user interface elements to be rendered as specified by the developer. From this markup, a parser constructs an element tree of elements. The tree may have a number of parent and child elements, and a child may be a parent of another child. The layout system (or subsystem) comprises an API set which essentially intercepts calls in the element tree directed from parent elements (e.g., containers) to child elements, and handles a number of sizing and positioning issues in a uniform way. For example, if a child requests more space than is available in a parent's UI element, the layout will resize and align the child content in a uniform way without the parent or child having to deal with resizing and repositioning rules. Children and parents do not have to deal with margin adjustments, layout alignment, clipping, transformations and so forth, which are handled by layout, which determines sizes and positions of user interface elements. Once layout decisions are made in the layout system and the elements in the element tree are properly configured, a renderer component (of a media integration layer, or MIL) takes data from the element tree, including the sizes and positions, drawing primitives and other information, and renders the user interface elements to a suitable display.

In one implementation, the layout system is divided between a core and framework component. In general, the core provides an underlying base infrastructure, (e.g., operating system APIs including operating system and primitive data types). The core provides a basic layout protocol, with little policy, in order to retain flexibility for frameworks to implement policy of their own. The core layout API handles sizing of elements to content behavior. The framework comprises an API that interoperates with the core, to provide most layout policy. A layout protocol is used to create convenient layouts and provide the API that is required to use those layouts.

The framework provides a number (e.g., eight) universal layout properties that enable developers to control layout behavior, including VerticalAlignment, HorizontalAlignment, Height, Width, MinWidth, MaxWidth, MinHeight, MaxHeight, Margin and FlowDirection. The VerticalAlignment and HorizontalAlignment properties include left, center, right, and stretch parameter values that describe how to position rendered output within an element (e.g., a rectangle) of a certain size. Height and Width are defined by the program (e.g. in the markup); ActualHeight and ActualWidth have variable values that are manipulated by the layout system as necessary for sizing, within MinWidth, MaxWidth, MinHeight and MaxHeight limits. Margin is defined as the space between an element and its siblings and parent bounds, and contains members for Left, Top, Right, and Bottom margins. FlowDirection refers to how text and rectangles produced by the layout will flow directionally to provide support for globalization of layouts by default, e.g., to allow text to flow in various directions depending on the language, e.g., left-to-right, and top-to-bottom for Western languages.

Layout is accomplished in a measuring phase and an arranging phase. In general, during each phase, the layout engine processes calls from a parent element to a child element, thereby getting an opportunity to apply a uniform and consistent policy with reference to sizing and positioning. A parent calls a child with an available size parameter value, to let the child know the size that is available for displaying content. A MeasureCore method may process the size value, and an implementer of a framework/layout system may override MeasureCore, to provide specific layout functionality. In one such framework, the override of MeasureCore determines a possibly modified available size (availableSize') based on the availableSize value, and the values of the Margin, Width, MinWidth, MaxWidth, Height, MinHeight and/or MaxHeight properties.

The MeasureOverride method provides the child with the availableSize' value, and receives a child's desired size in return. MeasureOverride may preserve this desired value, and return a modified desired size value to the parent, e.g., one that matches the available size.

The second phase in layout is the arrange process, which begins by a call to a core's Arrange method. The layout system may modify the sizes and manage the positioning based on the size values, position data and properties, e.g., as a function of DesiredSize, and the MinWidth, MinHeight, Width, Height, MaxWidth and/or MaxHeight properties. This becomes a final size passed down to the framework's ArrangeOverride method. ArrangeOverride performs its specific arrange logic, e.g., based on the child's desired size retained during the measuring phase, returning its final size finalSize'. ArrangeCore uses finalSize' to set ActualHeight and ActualWidth. Note that sizes larger than that available are clipped by the layout system, with alignment within the clipped region also handled based on the alignment property values (or defaults if none). Moreover, the layout system handles offsets.

Other advantages will become apparent from the following detailed description when taken in conjunction with the drawings, in which:

DETAILED DESCRIPTION

Exemplary Operating Environment

Figure 1:
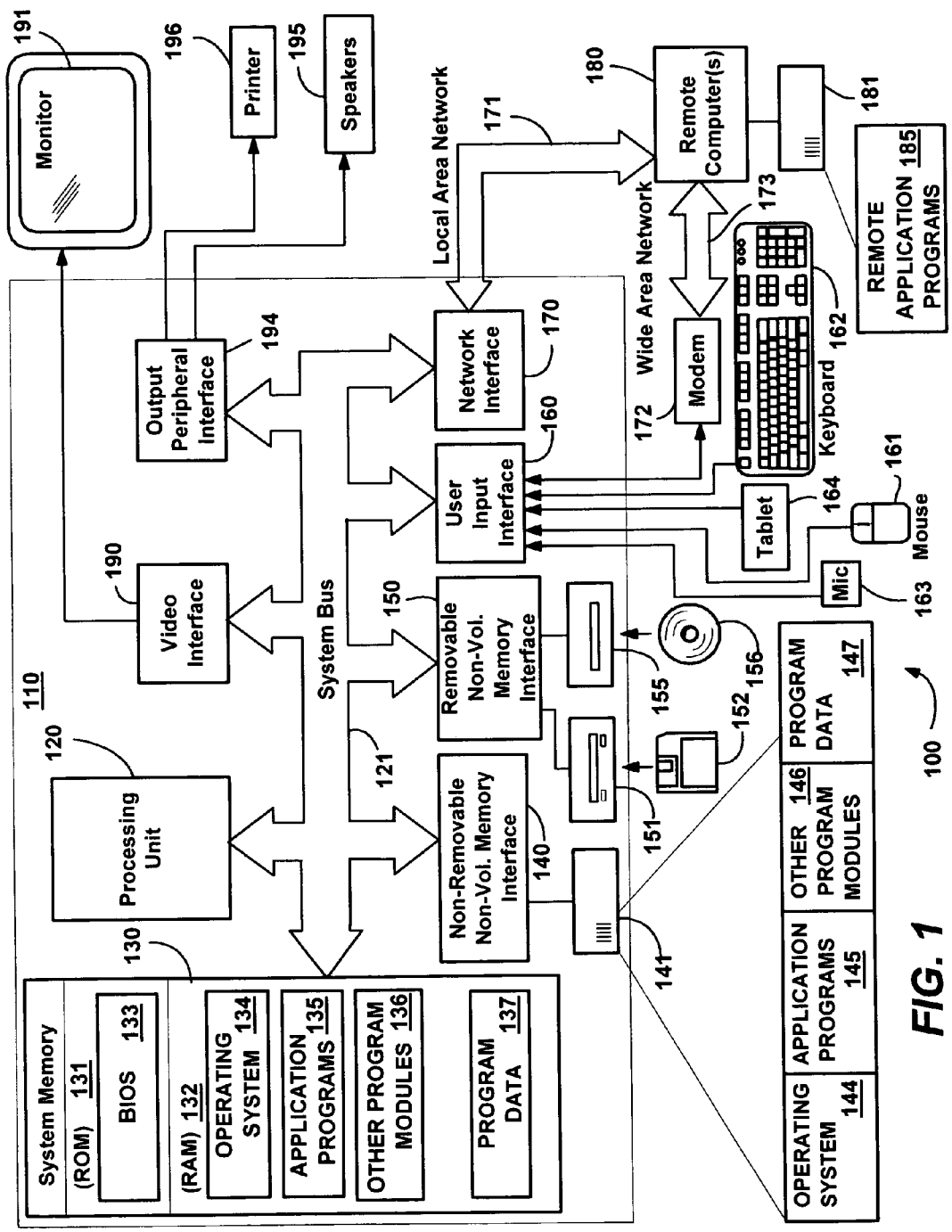
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Layout System

The present invention is generally directed towards solving a very broad set of problems that exist when dealing with user interface elements. To this end, there is provided unified core layout system functionality that is consistent across elements, and normalized to keep complex interactions as minimal as possible. Among the various benefits, extensibility is provided, by which third parties may write customized specific layouts that interoperate with the layout system, by leveraging layout functionality in the platform while receiving results consistent with the rest of the system.

The present invention also provides the concept of layout alignments which is used for general placement of elements everywhere, whereby specific layout implementations or containers are not required for a particular behavior. As will also be understood, the layout system provides uniform handling of general layout input values, in one central location in the layout system, including values such as Margin, Width, Height, MinWidth, MinHeight, MaxWidth and MaxHeight. This provides for substantially consistent behavior, and reuse of functionality, by third parties. This also allows for third parties to add their own uniform layout policy to an entire framework, where policy refers to imposed specified behavior or rules.

Further, because sizes of user interface elements cannot always be known ahead of time, the layout system of the present invention provides for the handling of over-constrained situations. For example, if a user interface element needs more space than can be provided, a protocol of the layout system will appropriately modify requested sizes passed between components, such that the end result uses space as optimally as possible given the constraints.

As will be also understood, numerous ways to implement the present invention are feasible, and only some of the alternatives are described herein. For example, the present invention is primarily described below with reference to markup that is parsed, however a developer can specify user interface elements and the like in other forms. Similarly, the present invention is described with reference to an example framework that when coupled to a core component provides a protocol and policy for layout via a number of properties; however a different framework may be coupled, with a different protocol and policy to achieve different results. Moreover, a core and framework model is not necessary to the present invention, as the functionality may be combined into single component, or may be divided up into more components. As such, the present invention is not limited to any particular examples used herein, but rather may be used various ways that provide benefits and advantages in computing in general.

Figure 2:
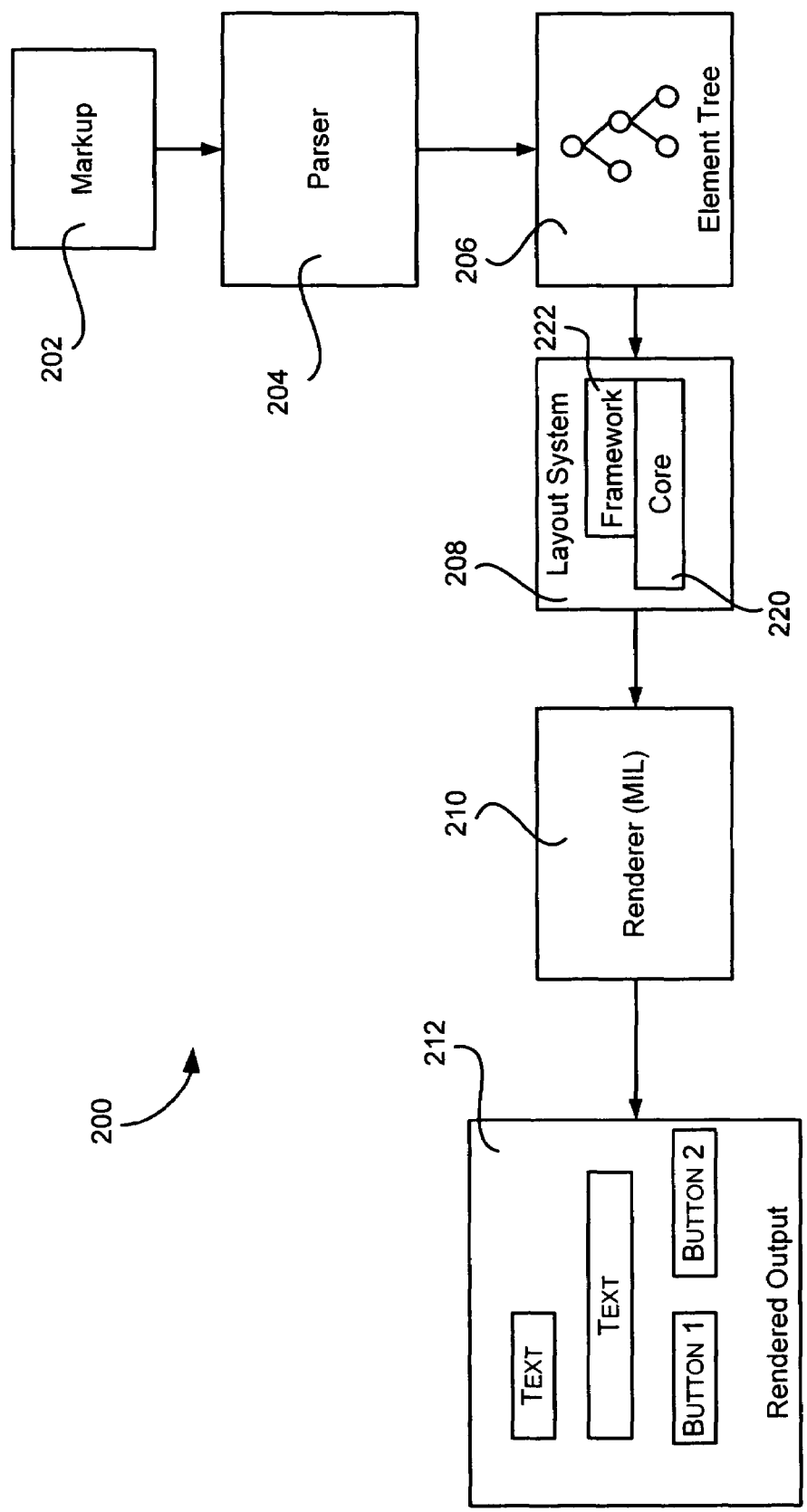
FIG. 2 is a block diagram including a general user interface rendering architecture, including a layout system configured in accordance with various aspects of the present invention.

Turning to FIG. 2, there is shown an example architecture 200 for rendering user interface elements. In general, a developer provides code (e.g., markup 202 of a suitable markup language) to cause user interface elements to be rendered as specified by the developer. For example, via markup, a developer may specify that a button should appear on the screen with certain parameters such as color, border, text and/or other appearance information. From this markup 202, a parser 204 constructs an element tree 206 of elements. The tree may have a number of parent and child elements, and a parent may be a container for one or more child elements, e.g., a parent menu bar may have child icons positioned therein. A child may be a parent of another child.

In accordance with an aspect of the present invention, a layout system (or subsystem) 208 is provided which removes much of the complexity of managing user interface element behavior. In one aspect, the layout system handles the conflict that often exists between what space the parent has available for the child, and the child's requirements. For example, for a child element that is constrained by its parent's available size, the layout system handles the result in a consistent and uniform way in an attempt to optimize space usage. Similarly, when a child is smaller than space provided by the parent, the layout system positions the child in an orderly way that is consistent and uniform across any type of elements.

To this end, and as described below, the layout system 208 comprises an API set which essentially intercepts calls in the element tree directed from parent elements (e.g., containers) to child elements, and as will be understood, handles a number of sizing and positioning issues in a uniform way. For example, if a child requests more space than is available in a parent's UI element, the layout will resize and position the child content in a uniform way without the parent or child having to deal with resizing and repositioning rules. Children and parents do not have to deal with margin adjustments, layout alignment, clipping, transformations and so forth, which are handled by layout, which determines sizes and positions of user interface elements. As described below, in one implementation, sizes are produced from "measuring" and positioning is done through "arranging," which each occur in distinct phases.

Once layout decisions are made in the layout system 208 and the elements in the element tree 206 are properly configured, a renderer component 210 (of a media integration layer, or MIL) takes data from the element tree 206, including the sizes and positions, drawing primitives and other information, and renders the user interface elements to a suitable display. For example, in FIG. 2, the rendered output 212 includes text boxes and buttons as the user interface elements, which are rendered representations of elements in the tree.

In one implementation, the layout system 208 is divided between a core 220 and framework component 222. In general, the core 220 provides an underlying base infrastructure, (e.g., operating system APIs including operating system and primitive data types), with little layout policy, and no dependencies outside of base system components, including no dependencies on the framework 222. The core 220 is where functionality and behavior that is considered timeless and non-framework specific resides. For layout, this is a basic layout protocol (described below), with as little policy as possible in order to retain flexibility for frameworks to implement policy of their own. In an example implementation described herein, the base class of the core is UIElement. Note that although in FIG. 2 the core 220 and framework 222 are shown as being within the layout system, in one actual implementation, the layout system 208 is only a subset of a much larger amount of functionality provided by the core 220 and framework 222.

Because various aspects of the present invention are targeted at developers producing applications with content having size which may not be known at authoring time, such as localized strings or databound content, layouts need to be able to size to content, where size to content refers to the ability of a layout to produce positions and sizes commensurate to the size of the content. The core layout API enables size to content behavior.

The framework 222, which provides useful and convenient functionality as an application platform, comprises an API residing on top of the core 220, and is capable of interoperating with the core 220. In an example implementation described herein, the base class of the framework is FrameworkElement. The framework 222 is where most layout policy is introduced, augmenting the core services. For layout, a layout protocol is used to create convenient layouts and provide the API that is required to use those layouts.

The FrameworkElement base class provides a number of universal layout properties (e.g., eight in one implementation), that enable developers to control layout behavior. The properties comprise VerticalAlignment, HorizontalAlignment, Height, Width, MinWidth, MaxWidth, MinHeight, MaxHeight, Margin and FlowDirection. The properties are universally consistent, that is, applicable with a consistent result to any FrameworkElement-derived class, and succinct such that properties are simple to understand and easy to use. The VerticalAlignment property includes top, center, bottom or stretch parameter values; the HorizontalAlignment property includes left, center, right, and stretch parameter values, which describe how to position rendered output within an element (e.g., a rectangle) of a certain size. Height and Width are set by the programmer, e.g., in markup. As described herein, the actual height and actual width that result are maintained in two read-only properties named ActualWidth and ActualHeight, which have variable values that are manipulated by the layout system as necessary for sizing, within MinWidth, MaxWidth, MinHeight and MaxHeight limits.

Another of the framework's properties is Margin. Margin is defined as the space between an element's allotted space and its rendering. Margin is of type Thickness, which contains four double members, for Left, Top, Right, and Bottom margins. Margin applies space outside of the layout's ActualWidth and ActualHeight; parent layouts add Margin to a child layout, computing their layout as if the child were effectively its ActualWidth/ActualHeight plus its Margin.

FlowDirection refers to how text will flow directionally. More particularly, the layout framework provides support for globalization of layouts by default, lowering the costs and effort required to build localizable components and applications. This means that the sizes and positions created for user interface elements can be globalized. For example, although globalization is not limited to text, the FlowDirection property allows text to move in various directions depending on the language, e.g., left-to-right, and top-to-bottom for Western languages.

In accordance with an aspect of the present invention, layout is accomplished in two phases (or passes), namely a measuring phase and an arranging phase. In general, during each phase, the layout engine 208 intercepts calls from a parent element to a child element, thereby getting an opportunity to apply a uniform and consistent policy with reference to sizing and positioning.

Figure 3:
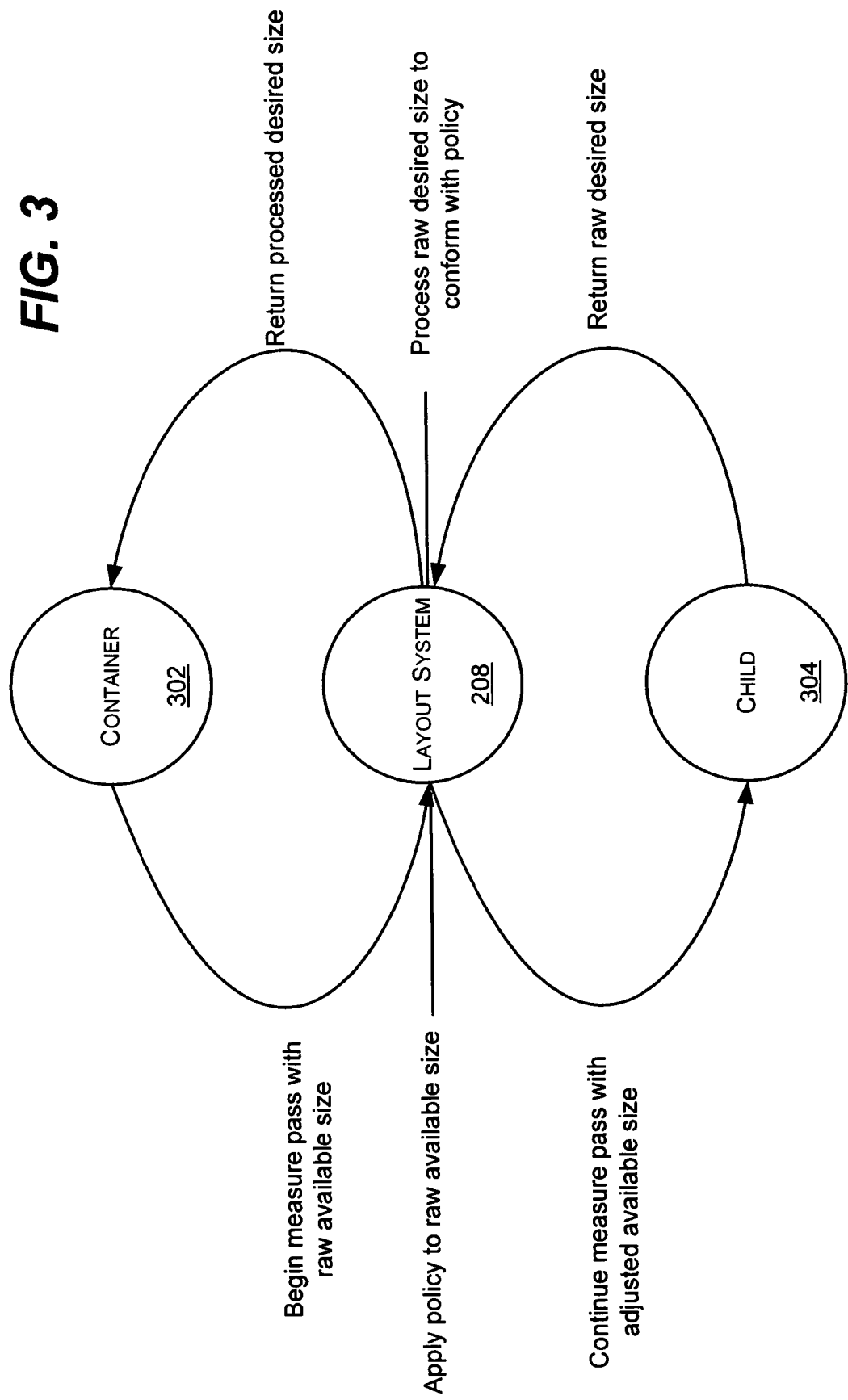
FIG. 3 is a representation of how a layout system interacts with UI-related elements in a measure phase to provide consistent user interface element layout behavior in accordance with various aspects of the present invention.

As generally represented in FIG. 3, as the layout system recursively looks at elements in the tree, the core layout process begins by having the container provide a raw size that is available for the user interface element to use. In one implementation, this is accomplished by a call to a method named "Measure" on a UIElement with an available size parameter named "availableSize." This available size is determined by the caller. For example, as represented in FIG. 3, a parent container 302 will typically direct such a call to its child 304 with this parameter, to let the child know the size that is available for displaying content. Note that a parent may have more than one child, and that a child may be a parent of another child, and so on, however for purposes of explanation, FIG. 3 shows only a single parent and child. From Measure, a virtual MeasureCore method may be called with the same available size. MeasureCore may return a desired size, named desiredSize, based on its own logic. The default implementation on UIElement returns a size of 0, 0. Measure uses the returned size desiredSize from MeasureCore to set the DesiredSize property for the respective element.

In keeping with the present invention, as represented in FIG. 3, an implementer of a framework/layout system 208 may apply policy to this raw available size and change it in some way consistent with the policy. In one implementation, this is accomplished by a call to override MeasureCore, to provide specific layout functionality, e.g., FrameworkElement's override of MeasureCore calls MeasureOverride. In one such framework, the override of MeasureCore determines an available size, availableSize' as a function $f_M$(availableSize, Margin, Width, MinWidth, MaxWidth, Height, MinHeight, MaxHeight).

$f_M$ is defined as the following, where $f_M$=Size(availableSize'.Width, availableSize'.Height):

```
For w = availableSize.Width – Margin.Left – Margin.Right,
    if( Width is set)
        availableSize'.Width = Max( Min( Width, MaxWidth), MinWidth);
    else
        availableSize'.Width = Max( Min( w, MaxWidth ), MinWidth );
        --and--
For h = availableSize.Height – Margin.Top – Margin.Bottom,
    if( Height is set )
        availableSize'.Height = Max( Min(Height, MaxHeight), MinHeight);
    else
        availableSize'.Height = Max( Min( h, MaxHeight ), MinHeight );
```

By way of example, a parent may direct a measure call to a child with a value indicating a height of 100 pixels, a width of 200 pixels, and a margin of 5 pixels on each side. The layout system 208 will take care of the margins, and as also represented in FIG. 3, will tell the child 304 that the available size is a height of 90 pixels and a width of 190 pixels; the size has been adjusted by the layout system 208, but the child 304 does not know. As represented in FIG. 3, the child 304 then returns a raw desired size to the layout system 208.

In one implementation, because FrameworkElement does not perform specific layout strategies, the virtual MeasureOverride provides this functionality. Here, the specific implementation of MeasureOverride computes a desired size desiredSize' which is the size the element can be, based on the available size availableSize'. The size does not include Margins, which are handled by MeasureCore. MeasureCore returns the desiredSize to Measure applying the following logic:

```
if(desiredSize'.Width > availableSize'.Width)
    desiredSize.Width = availableSize'.Width + Margin.Left +
        Margin.Right;
else
    desiredSize.Width = desiredSize'.Width + Margin.Left +
        Margin.Right;
        --and--
if(desiredSize'.Height > availableSize'.Height)
    desiredSize.Height = availableSize'.Height+Margin.Top +
        Margin.Bottom;
else
    desiredSize.Height = desiredSize'.Height + Margin.Top +
        Margin.Bottom;
```

Examples of constraints are set forth below, but in general, the layout system 208 receives the raw available size, if necessary tells the child an adjusted available size based on subtracting the margins, and receives a raw desired size from the child. In the event that the child size does not fit/match the parent's available size, the layout system 208 processes the raw desired size to conform with policy, and adjusts the returned value of the desired size to the parent so that it does fit/match. This is represented in FIG. 3 by the processed desired size being returned to the parent container 302. The layout system 208 also retains the child's desired size, and in the arrange phase, uses that retained size to obtain the child's full data while handling clipping, alignment, resizing and so forth, as described below. Thus, the developer specifying the parent and child elements need not deal with sizing issues, including when constraints and alignments are involved, as this is handled by the layout system 208, providing uniform and consistent results.

Figure 4:
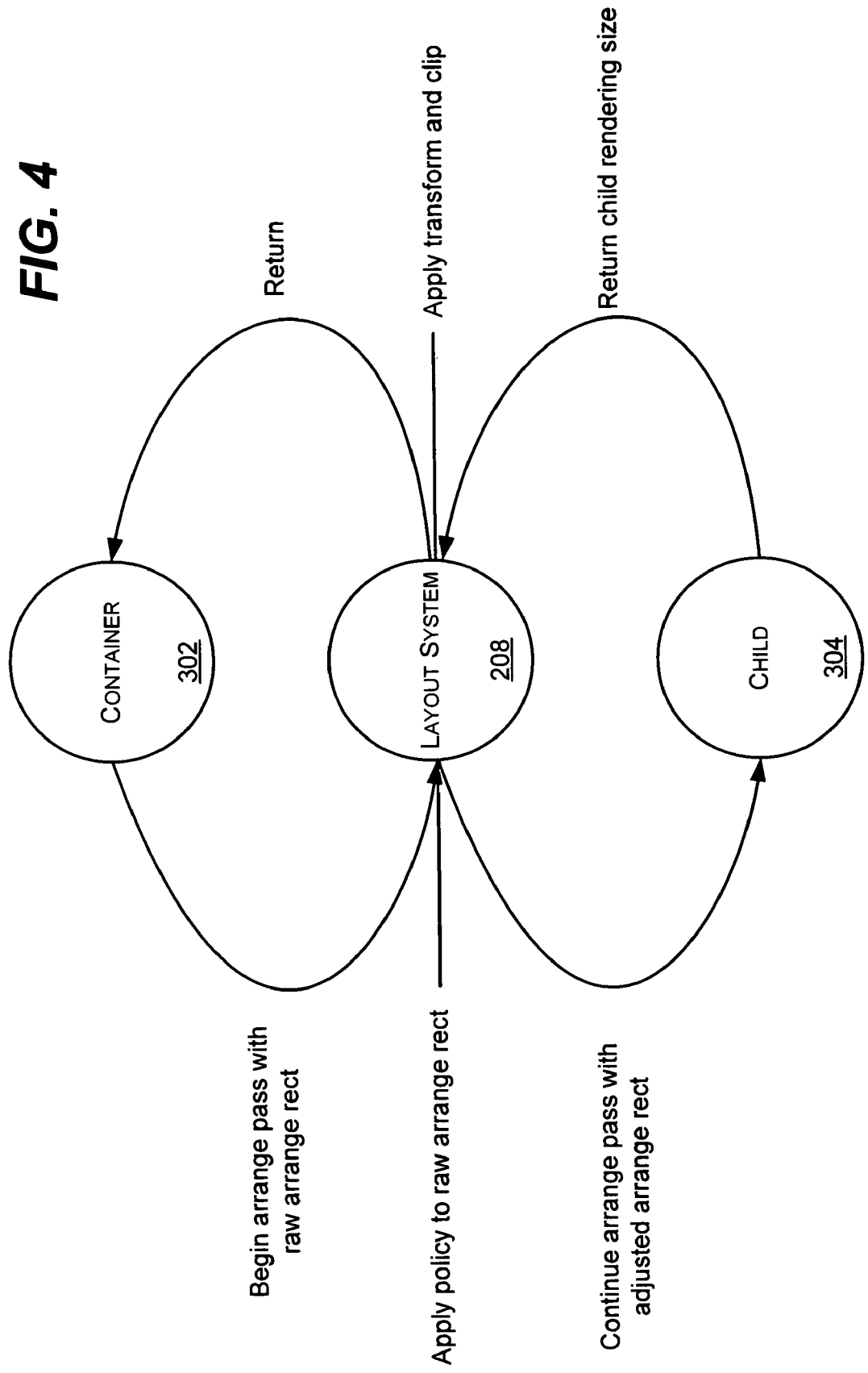
FIG. 4 is a representation of how a layout system interacts with UI-related elements in an arrange phase to provide consistent user interface element layout behavior in accordance with various aspects of the present invention.

As mentioned above, the second phase/pass in layout is the arrange process, generally represented in FIG. 4. In FIG. 4, the parent container 302 directs a call to the child element 304 to provide it with a rendering area, e.g., a rectangle. Again, the layout system receives the call and can process the data in accordance with policy. In one implementation, this is accomplished by the container's call to a core's Arrange method, passing the size and position in the form of a variable nonClientRect (e.g., of type Rect in this implementation) in which the child should be arranged (and typically should render). The nonClientRect is the rectangle relative to the parent of the child. The Arrange method then directly calls the virtual ArrangeCore, passing the same Rect nonClientRect. The default implementation of ArrangeCore merely arranges with the nonClientRect.

In keeping with the present invention, and as represented in FIG. 4, the framework/layout system 208 is able to control the Arrange process. To this end, the layout system 208 can change the rectangle information and continue the arrange phase/pass by providing the adjusted rectangle information to the child 304. In one implementation, analogous to the framework measure process, the framework arrange process is an extension of the core arrange process. The FrameworkElement override of ArrangeCore determines a final size finalSize as a function $f_A$(DesiredSize, MinWidth, MinHeight, Width, Height, MaxWidth, MaxHeight). This final size finalSize is passed down to ArrangeOverride. $f_A$ is defined as follows:

$f$hd A=Size(finalSize.Width, finalSize.Height):

```
For
    dw = DesiredSize.Width − Margin.Left − Margin.Right,
    fw = nonClientRect.Width − Margin.Left − Margin.Right,
    if ( Width is set)
        finalSize.Width = Max( Min( Width, MaxWidth ), MinWidth );
    else if ( HorizontalAlignment is set to Stretch and if dw ≦ fw ≦
    MaxWidth)
        finalSize.Width = Max( Min( fw, MaxWidth ), MinWidth );
    else
        finalSize.Width = Max( Min( dw, MaxWidth ), MinWidth );
            --and--
For
    dh = DesiredSize.Height − Margin.Top − Margin.Bottom,
    fh = nonClientRect.Height − Margin.Top − Margin.Bottom,
    if ( Height is set)
        finalSize.Height = Max( Min( Height, MaxHeight ),
        MinHeight );
    else if ( VerticalAlignment is set to Stretch and if dh ≦ fh ≦
    MaxHeight)
        finalSize.Height = Max( Min( fh, MaxHeight ), MinHeight );
    else
        finalSize.Height = Max( Min( dh, MaxHeight ), MinHeight );
```

ArrangeOverride performs its specific arrange logic returning its final size finalSize'. ArrangeCore uses finalSize' to set ActualHeight and ActualWidth; these values do not contain the margins:

```
if ( finalSize.Width < ActualWidth || finalSize.Height < ActualHeight)
{
    ClipToBounds= true;
    ClipRect = new Rect(Margin.Left, Margin.Right, finalSize.Width,
finalSize.Height);
}
```

Note that any transformations which cause an element to leave the "arrange rectangle" will be clipped in the case that the DesiredSize is larger than the available size.

With respect to adjusting the arrange size, as mentioned above, the layout system 208 retained the child's desired size, and thus in the arrange process can return this back as the size it gives to the child. Thus, in the example where the child received an available size of 90 pixels high by 190 pixels wide, if the child specified more in either dimension or both, the arrange process gives the retained size to the child, which thus matches the child's desired size and the child need not be concerned with any sizing difference (which it might handle incorrectly). As represented in FIG. 4, the child 304 thus returns its rendering size. As also represented in FIG. 4, if the child's content is larger than that available, the layout system 208 then clips or transforms the content so that it fits the parent's available space, using alignment properties associated with the child (or default alignment properties if not specified), as generally described below. The parent container 302 then receives a return to complete its arrange call.

The element's ClipRect is set from an amount given by the function $f_a$, which is described below, to the finalSize:

$f_a$(finalSize', Margin, HorizontalAlignment, VerticalAlignment)

```
For
    double offset = Left edge of the ClipRect
switch( HorizontalAlignment )
{
    case (HorizontalAlignment.Left):
```

```
        offset = Margin.Left;
        break;
    case (HorizontalAlignment.Right):
        offset = nonClientRect.Width − ActualWidth − Margin.Right;
        break;
    case (HorizontalAlignment.Center):
        offset =0.5*(nonClientRect.Width+Margin.Left−Margin.Right−
        ActualWidth);
        break;
    case (HorizontalAlignment.Stretch):
        offset =Margin.Left;
        break;
}
    --and--
For
    double offset = Top edge of the ClipRect
switch( VerticalAlignment )
{
    case (VerticalAlignment.Top):
        offset = Margin.Top;
        break;
    case (VerticalAlignment.Bottom):
        offset = nonClientRect.Height − ActualHeight − Margin.Bottom;
        break;
    case (VerticalAlignment.Center):
        offset =0.5* (nonClientRect.Height+Margin.Top−
        Margin.Bottom−ActualHeight);
        break;
    case (VerticalAlignment.Stretch):
        offset =Margin. Top;
        break;
}
```

Moreover, the layout system 208 handles offsets. To this end, size and position data that are provided are not passed to the child, but instead removed and essentially recomputed (e.g., added back by the layout system. This way, the child essentially need only provide its content for position 0,0, whereby offsets are handled consistently by the layout system rather than by each child container. Note that layout alignment may determine offset, e.g., if the alignment is right, a negative offset will be computed to ensure that the rightmost part of child's content (text or image) is aligned up to the right edge of the rendered element; any clipping would clip the left part of the child's content having a right alignment property value.

Note that some parent layouts do not need to know the child layout's DesiredSize, such as if their layout is fixed, always sizing children to (100,100) for example. In such cases, the parent layout need not call Measure( ) on child layouts during its measuring pass. Such a parent would wait until its arranging pass, and directly call a child's Arrange with the desired Rect. The layout system will then automatically call the child's Measure function with an input of the size of the arrange Rect, in order to guarantee that an element will never receive an Arrange if its Measure is invalid. Note that the layout system does not automatically call Arrange at render time; an element which does not have a valid Measure or Arrange is un-renderable and will not receive an OnRender call.

VerticalAlignment and HorizontalAlignment are properties associated with the child element and used by FrameworkElement. These two properties allow content of a layout partition (as determined by the layout) to be aligned within that partition. The use of alignment properties in layout have been described above. The following examples of markup, and corresponding FIGS. 5-13, demonstrate how the values for alignments affect layout.

When the content of a child is not constrained by its parent, (e.g., the available size to the content is no less than its desired size), the following markup samples result in output represented by FIGS. 5-10. Note that FIGS. 5-10 would actually be rendered in color on a color display, but have been converted to grayscale in the present application's drawing figures.

Figure 5:
FIGS. 5-10 comprise various representations of rendered elements in an unconstrained mode, based on values of layout properties handled in accordance with various aspects of the present invention.

FIG. 5 shows default alignments (e.g., stretch horizontally and vertically when not otherwise specified) in a non-constrained case, based on the following markup, which specifies a button for rendering:

```
<Border Height="200" Width="300" BorderThickness="20"
   BorderBrush="Navy" Background="Khaki">
      <Button FontSize="20">Hello World</Button>
   </Border>
```

Figure 6:
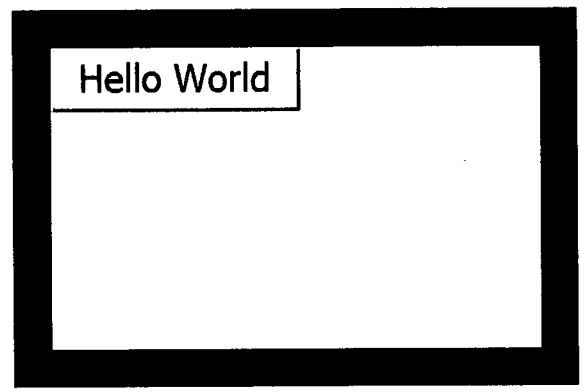

FIG. 6 shows Left (horizontal) and Top (vertical) alignments in a non-constrained case, based on the following markup:

```
<Border Height="200" Width="300" BorderThickness="20"
BorderBrush="Navy" Background="Khaki">
      <Button HorizontalAlignment="Left" VerticalAlignment="Top"
FontSize="20">Hello World</Button>
   </Border>
```

Figure 7:
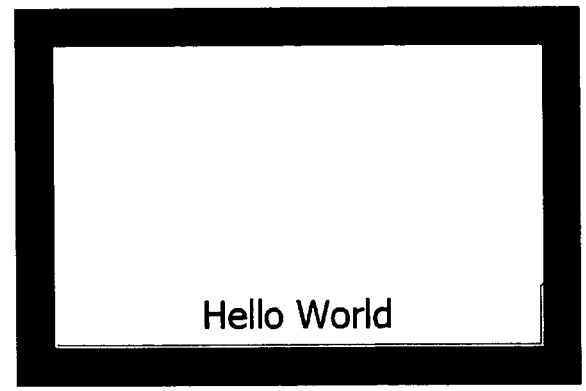

FIG. 7 shows an example of horizontal stretch and bottom vertical alignment of the button, based on the following markup:

```
<Border Height="200" Width="300" BorderThickness="20"
BorderBrush="Navy" Background="Khaki">
      <Button HorizontalAlignment="stretch" VerticalAlignment="bottom"
FontSize="20">Hello World</Button>
   </Border>
```

Note that the "stretch" value allows an element to extend independent of the child's desired size, e.g., corresponding to its actual content size such as the text's length. This is useful when, for example, displaying a number of buttons and wanting each button to have the same size as each other button, rather than being sized and positioned based on the text to be rendered therein.

Figure 8:
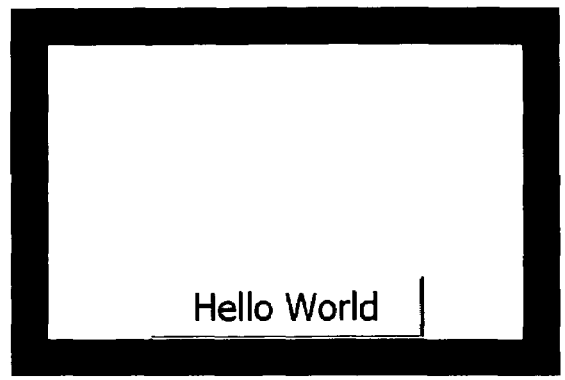

FIG. 8 shows an example of horizontal stretch with a limited width, and bottom vertical alignment of the button, based on the following markup:

```
<Border Height="200" Width="300" BorderThickness="20"
BorderBrush="Navy" Background="Khaki">
      <Button HorizontalAlignment="stretch" VerticalAlignment="bottom"
FontSize="20" Width="150">Hello World</Button>
   </Border>
```

Figure 9:

FIG. 9 shows an example of a limited width, and right-horizontal, center-vertical alignment of the button, based on the following markup:

```
<Border Height="200" Width="300" BorderThickness="20"
BorderBrush="Navy" Background="Khaki">
      <Button HorizontalAlignment="Right" VerticalAlignment="center"
FontSize="20" Width="150">Hello World</Button>
   </Border>
```

Figure 10:

FIG. 10 shows an example of a right-aligned button with margins, based on the following markup:

```
<Border Height="200" Width="300" BorderThickness="20"
BorderBrush="Navy" Background="Khaki">
      <Button Margin="0, 20, 5, 20" HorizontalAlignment="Right"
VerticalAlignment="stretch" FontSize="20" Width="150">Hello
World</Button>
   </Border>
```

Figure 11:
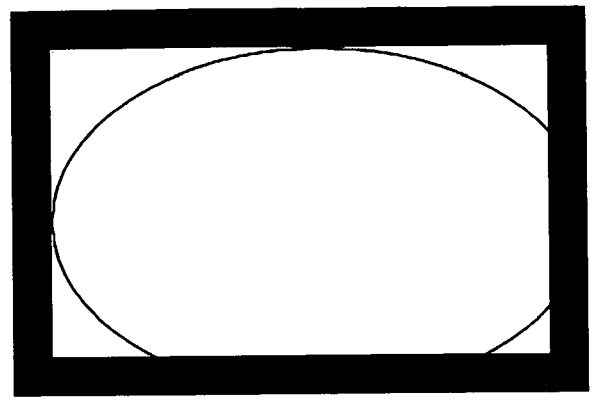
FIGS. 11-14 comprise various representations of rendered elements in a constrained mode, based on values of layout properties handled in accordance with various aspects of the present invention.
Figure 12:
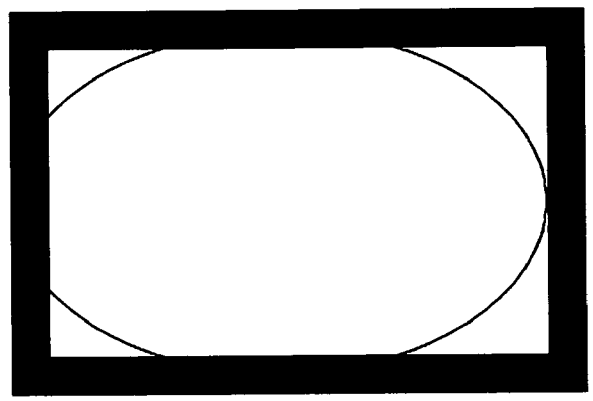
Figure 13:
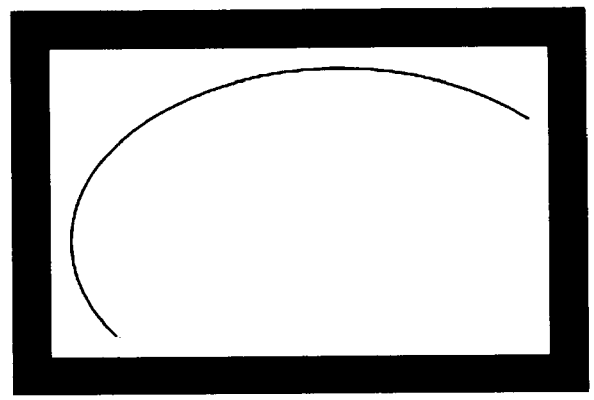

FIGS. 11-13 show (grayscale-equivalent) examples when there is some constraint resulting from the content being larger than the available space. FIG. 11 shows a constrained ellipse image given defaults (top and left in this example), based on the following markup:

```
<Border Height="200" Width="300" BorderThickness="20"
BorderBrush="Navy" Background="Khaki">
      <Ellipse Width="280" Height="180" Fill="yellow" Stroke="black"/>
   </Border>
```

FIG. 12 shows the same ellipse but with horizontally right and vertically centered alignment, based on the following markup:

```
<Border Height="200" Width="300" BorderThickness="20"
BorderBrush="Navy" Background="silver">
      <Ellipse HorizontalAlignment="Right" VerticalAlignment="Center"
Width="280" Height="180" Fill="yellow" Stroke="black"/>
   </Border>
```

FIG. 13 shows the effects of the margin property within the same bordered container box, with constrained behavior, based on the following markup:

```
<Border Height="200" Width="300" BorderThickness="20"
BorderBrush="Navy" Background="silver">
      <Ellipse Margin="10" Width="280" Height="180" Fill="yellow"
Stroke="black"/>
   </Border>
```

As described above, the use of the Measure and Arrange APIs are fairly straightforward. Notwithstanding, the following example provides markup using a layout called FictitiousPanel that helps explain Measure and Arrange with actual values. The behavior for FictitiousPanel is that it "stacks" child elements vertically. A handful of properties have been set on the elements, including the alignments and margins.

```
...
<FictitiousPanel Background="khaki">
   <FictitiousPanel.Resources>
      <Style>
         <Text FontSize="18" Background="salmon"/>
      </Style>
   </FictitiousPanel.Resources>
   <Text HorizontalAlignment="Right" Margin="10,0,10,0">
      First Text
   </Text>
   <Text HorizontalAlignment="Center" Margin="30,0,10,0">
      The second Text with long text which will not wrap.
   </Text>
```

```
<Text HorizontalAlignment ="Stretch" Margin="20,0,10,0">
    The Third Text
</Text>
</FictitiousPanel>
...
```

Figure 14:

FIG. 14 shows (in grayscale equivalent) the final layout results after the Measure and Arrange processes as described in in the following explanation example. For brevity and simplicity herein, only the layout Width is followed in this example. The layout API and process are symmetrical; Height and Width are orthogonal.

FictitiousPanel receives a Measure call at a value of 300; (note that where the value 300 actually comes from is completely determined by the caller of Measure on FictitiousPanel, and is only important as a starting value). Next, MeasureCore is called passing 300, since no margins are set on the FictitiousPanel itself. As described above, MeasureCore then calls to MeasureOverride which contains FictitiousPanel's specific measuring logic. From FictitiousPanel's MeasureOverride, Measure on its children is called.

The first Text child's Measure is called with an available size of 300. Measure calls MeasureCore, where the margins are removed before being passed to MeasureOverride. MeasureOverride receives an available size (width only in this example) of 300−10−10=280. The first Text (child element) reports a desired size of 120 from MeasureOverride to MeasureCore. MeasureCore adds the margins back on to the value and returns 120+10+10 =140 to Measure, where the DesiredSize is set to 140.

The second child's Measure call is called with the same available size of 300; MeasureCore is provided with the same value. MeasureOverride is then called with the margins removed at 300−30−10=260. Text returns to MeasureOverride a desired size of 290. MeasureOverride returns this to MeasureCore. MeasureCore adds the margins back and returns 290+30+10=330 to Measure. Measure sets the DesiredSize to 330.

The third child's Measure is, again, called with 300 and that is passed to MeasureCore. MeasureCore removes the margins so that the remaining available space for MeasureOverride is 300−20−10=270. The third text returns a desired size of 190 to MeasureOverride. MeasureOverride returns 190 to MeasureCore where MeasureCore adds the margins back to this number before returning it to Measure. Measure receives 190+20+10=220 and sets 220 as the element's DesiredSize.

FictitiousPanel returns the maximum size of its children 330 from MeasureOverride to MeasureCore. MeasureCore returns this to Measure (there were no margins to add) where it is used to set FictitiousPanel's DesiredSize. Note that the maximum is used to reserve a layout partition for each child based on the maximum, e.g., so that the text content of the first, second and third texts will appear in rectangles of the same size.

In the Arrange phase, FictitiousPanel receives an Arrange call with Rect(0,0,300,x); (note that the DesiredSize was 330, thus, receiving an arrange with a Rect that is only 300 wide means that an ArrangeOverride reduced the value after having received it from ArrangeCore). Again, where this information comes from is dependent on the caller of Arrange and, again, the vertical dimension is being ignored herein for brevity and simplicity herein. Arrange then passes this rect unchanged to ArrangeCore. ArrangeCore passes down 300 to ArrangeOverride.

FictitiousPanel arranges its children by calling their Arrange from its ArrangeOverride, which will partition the vertical space using the available width of 300. The first Text gets a call to its Arrange with a rect(0,0, 300, x). This gets passed to ArrangeCore unchanged. ArrangeOverride is called where the final size passed is the width of the original available size rectangle's width. In this case, the value will be the DesiredSize less the horizontal margins: 140−10−10=120. Text then returns its final size to ArrangeCore which sets the ActualWidth. Based on the HorizontalAlignment property value (Right) and the margins, ArrangeCore sets an offset on the Text of 300−120−10=170. As shown in FIG. 14, the "First Text" appears right aligned up to the right side margin of ten (10).

The second Text gets a call to its Arrange also with a rect 300 wide. This gets passed to ArrangeCore. This Text is arranged at its DesiredSize less the margins, so, 330−30−10=290 gets passed to ArrangeOverride. ArrangeOverride returns the final size 290 to ArrangeCore where the ActualWidth is set to 290; the ClipRect is set from 0.5*(300+30−10−290)=15 to 300. As shown in FIG. 14, the string for the second text appears center-aligned with the appropriate left and right margins.

The third (last in this example) Text gets a call to its Arrange with the 300 rect, which is then passed directly to ArrangeCore. ArrangeCore removes the margins to pass a size of 300−20−10=270 because the HorizontalAlignment is Stretch. ArrangeOverride returns the final size 270 which is used to set the ActualWidth. ArrangeCore then offsets the Text by 20. FictitiousPanel's ArrangeOverride returns a final size of 300 to ArrangeCore which uses this to set FictitiousPanel's ActualWidth. As shown in FIG. 14, "The Third Text" appears left aligned up to the right side margin of twenty (20).

API Summary

UIElement API

The following details the UIElement API; (note that in one implementation, the UIElement API has other properties, members, and events that are not relevant to layout and are not set forth herein):

```
namespace System.Windows
{
  public class UIElement
  {
    public static readonly DependencyProperty VisibilityProperty;
    public static readonly DependencyProperty ClipToBoundsProperty;
    public Size DesiredSize { get; }
    public bool IsMeasureValid { get; }
    public bool IsArrangeValid { get; }
    public Visibility Visibility { get; set; }
    public bool ClipToBounds { get; set; }
    public void Arrange(Rect childLocation);
    protected virtual void ArrangeCore(Rect childLocation);
    public void InvalidateArrange( );
    public void InvalidateMeasure( );
    protected virtual void OnChildDesiredSizeChanged(UIElement child);
    public void Measure(Size availableSize);
    protected virtual Size MeasureCore(Size availableSize);
    public void UpdateLayout( );
    public event EventHandler LayoutUpdated;
  }
}
```

Fields

Public Static Readonly DependencyProperty VisibilityProperty
Property system identifier for the Visibility property.

Public Static Readonly DependencyProperty ClipToBoundsProperty
Property system identifier for the ClipToBounds property.

Properties
Public Size DesiredSize {get;}
Public Bool IsMeasureValid {get;}
Public Bool IsArrangeValid {get;}
Public Visibility Visibility {get; set;}
Default Value: Visibility.Visible
Animatable: No
Inheritable: No
Databindable: Yes
Serializable: Yes
Code Editor Visibility: true
Designer Visibility: true Methods Public Sealed Void Arrange(Rect ChildLocation);
The API which is called after Measure is complete. The argument is a Rect which specifies the non-client size and position for the element on which Arrange is being called.

Protected Virtual Void ArrangeCore(Rect ChildLocation);
Called by Arrange which passes the same non-client size and position as a Rect. Implementers of a framework can override this method and still maintain interoperability.

Public Void Measure(Size AvailableSize);
Measure is called on an element with an available size, the size which the parent is allowing its child. Measure sets the DesiredSize of an element upon return.

Protected Virtual Size MeasureCore(Size AvailableSize);
MeasureCore is called by Measure which passes in the size which the parent is allowing this child. Implementers of a framework can override this method and still maintain interoperability.

Public Void InvalidMeasure( )
Invalidates the element's DesiredSize, adding the element to the layout queue and setting IsMeasureValid to False.

Public Void InvalidateArrange( )
Invalidates the element's ActualHeight and ActualWidth, adding the element to the layout queue and setting IsArrangeValid to True.

Protected Virtual Void OnChildDesiredSizeChanged (UIEelement Child)
Used by layout implementations to know when an individual child has changed which may require re-measure or re-arrange.

Public Void UpdateLayout( )
Method to force a layout update on the given UIElement.

Events

Public Event EventHandler LayoutUpdated;
This event fires after Layout updates the layout of the trees associated with current UIContext. Layout update can happen as a result of some property change, window resize or explicit user request. Handlers of this event are always guaranteed to get a "clean" layout (IsMeasureValid==true/IsArrangeValid==true) but the timing is not defined.

Supporting Core Types

Visibility

```
namespace System.Windows
{
    public enum Visibility { Visible, Hidden, Collapsed }
}
```

FrameworkElement API
The following details the FrameworkElement API; (note that in one implementation, the UIElement API has other properties, members, and events that are not relevant to layout and are not set forth herein):

```
FrameworkElement
namespace System.Windows
{
    public class FrameworkElement : UIElement
    {
        public static readonly DependencyProperty WidthProperty = ...;
        public static readonly DependencyProperty HeightProperty = ...;
        public static readonly DependencyProperty MinWidthProperty = ...;
        public static readonly DependencyProperty MaxWidthProperty = ...;
        public static readonly DependencyProperty MinHeightProperty = ...;
        public static readonly DependencyProperty MaxHeightProperty = ...;
        public static readonly DependencyProperty MarginProperty = ...;
        public static readonly DependencyProperty FlowDirectionProperty = ...;
        public static readonly DependencyProperty HorizontalAlignmentProperty = ...;
        public static readonly DependencyProperty VerticalAlignmentProperty = ...;
        public double Width { get; set; }
        public double Height { get; set; }
        public double MinWidth { get; set; }
        public double MinHeight { get; set; }
        public double MaxWidth { get; set; }
        public double MaxHeight { get; set; }
        public Thickness Margin { get; set; }
        public FlowDirection FlowDirection { get; set; }
        public HorizontalAlignment HorizontalAlignment { get; set; }
```

-continued

```
        public VerticalAlignment VerticalAlignment { get; set; }
        protected sealed override void ArrangeCore(Rect childLocation);
        protected sealed override Size MeasureCore(Size availableSize);
        protected virtual Size ArrangeOverride(Size finalSize);
        protected virtual Size MeasureOverride(Size availableSize);
        public event EventHandler SizeChangedEvent;
}
    public sealed override delegate void SizeChangedEventHandler(object sender, SizeChangedEventArgs e);
}
```

Fields

Public Static Readonly DependencyProperty WidthProperty
    Property system identifier for the Width property.

Public Static Readonly DependencyProperty HeightProperty
    Property system identifier for the Width property.

Public Static Readonly DependencyProperty MinWidthProperty
    Property system identifier for the Width property.

Public Static Readonly DepedencyProperty MaxWidthProperty
    Property system identifier for the Width property.

Public Static Readonly DependencyProperty MinHeightProperty
    Property system identifier for the Width property.

Public Static Readonly DependencyProperty MaxHeightProperty
    Property system identifier for the Width property.

Public Static Readonly DependencyProperty MarginProperty
    Property system identifier for the Width property.

Public Static Readonly DependencyProperty FlowDirectionProperty
    Property system identifier for the Width property.

Public Static Readonly DependencyProperty HorizontalAlignmentProperty
    Property system identifier for the HorizontalAlignment property.

Public Static Readonly DependencyProperty VerticalAlignmentProperty
    Property system identifier for the VerticalAlignment property.

Properties

Public Double Width {Get; Set;}
    Default Value: Double.NaN
    Animatable: Yes
    Inheritable: No
    Databindable: Yes
    Serializable: Yes
    Code Editor Visibility: true
    Designer Visibility: true
    Valid Range: Non-negative and Double.NaN.
    The default value for Width is set to Double.NaN because a "special" value which means "unset" is needed. In markup, Double.NaN can be set by using the type-converter-recognized word "Auto."

<Button Width="Auto"/>

Public Double Height {Get; Set;}
    Default Value: Double.NaN
    Animatable: Yes
    Inheritable: No
    Databindable: Yes
    Serializable: Yes
    Code Editor Visibility: true
    Designer Visibility: true
    Valid Range: Non-negative and Double.NaN.
    The default value for Height is set to Double.NaN because a "special" value which means "unset" is needed. In markup, Double.NaN can be set by using the type-converter-recognized word "Auto."

<Button Height="Auto"/>

Public Double MinWidth {Get; Set;}
    Default Value: 0 (zero)
    Animatable: Yes
    Inheritable: No
    Databindable: Yes
    Serializable: Yes
    Code Editor Visibility: true
    Designer Visibility: true
    Valid Range: Non-negative.

Public Double MinHeight {Get; Set;}
    Default Value: 0 (zero)
    Animatable: Yes
    Inheritable: No
    Databindable: Yes
    Serializable: Yes
    Code Editor Visibility: true
    Designer Visibility: true
    Valid Range: Non-negative.

Public Double MaxWidth {Get; Set;}
    Default Value: Double.PositiveInfinity
    Animatable: Yes
    Inheritable: No
    Databindable: Yes
    Serializable: Yes
    Code Editor Visibility: true
    Designer Visibility: true
    Valid Range: Non-negative and Double.PositiveInfinity.

Public Double MaxHeight {Get; Set;}
    Default Value: Double.PositiveInfinity
    Animatable: Yes
    Inheritable: No
    Databindable: Yes
    Serializable: Yes
    Code Editor Visibility: true
    Designer Visibility: true Valid Range: Non-negative and Double.PositiveInfinity.

Public Thickness Margin {Get; Set;}
  Default Value: (0,0,0,0)
  Animatable: Yes
  Inheritable: No
  Databindable: Yes
  Serializable: Yes
  Code Editor Visibility: true
  Designer Visibility: true
  Valid Range: n/a Public HorizontalAlignment HorizontalAlignment {Get; Set;}
  Default Value: HorizontalAlignment.Stretch
  Animatable: No
  Inheritable: No
  Databindable: Yes
  Serializable: Yes
  Code Editor Visibility: true
  Designer Visibility: true
  Specifies the horizontal alignment behavior inside of a layout partition.

Public VerticalAlignment VerticalAlignment {Get; Set;}
  Default Value: VerticalAlignment.Stretch
  Animatable: No
  Inheritable: No
  Databindable: Yes
  Serializable: Yes
  Code Editor Visibility: true
  Designer Visibility: true
  Specifies the horizontal alignment behavior inside of a layout partition.

Methods

Protected Sealed Override Void ArrangeCore(Rect ChildLocation);
  Contains Framework policy implementation for arranging; calls into virtual ArrangeOverride.

Protected Sealed Override Size MeasureCore(Size AvailableSize);
  Contains Framework policy implementation for measuring; calls into virtual MeasureOverride.

Protected Virtual Size ArrangeOverride(Size FinalSize);
  Returns Size(0,0); overridden by Panels to implement specific arrange strategy.

Protected Virtual Size MeasureOverride(Size AvailableSize);
  Returns Size(0,0); overridden by Panels to implement specific measure strategy.

Events

Public Event SizeChangedEventHandler SizeChanged {Add; Remove;}
  The SizeChanged event is fired when ActualWidth or ActualHeight (or both) change.
  The SizeChangedEventArgs parameter contains new and old sizes, and flags indicating whether it was ActualWidth or ActualHeight that changed. These flags are provided to avoid the common mistake of comparing new and old values since simple compare of double-precision numbers can yield "not equal" when the value, in fact, did not change.

Supporting Types

Alignments

```
enum VerticalAlignment
{
    Top,
    Center,
    Bottom,
    Stretch,
}
enum HorizontalAlignment
{
    Left,
    Center,
    Right,
    Stretch,
}
```

Thickness

```
namespace System.Windows
{
    public Thickness( );
    public Thickness(double Left, double Top, double Right, double Bottom);
    public double Left {get; set;}
    public double Top {get; set;}
    public double Right {get; set;}
    public double Bottom {get; set;}
}
```

All margin values must be non-negative.

FlowDirection

```
namespace System.Windows
{
    public enum FlowDirection
    {
        LeftToRightThenTopToBottom,
        RightToLeftThenTopToBottom,
        TopToBottomThenRightToLeft,
        TopToBottomThenLeftToRight,
    }
}
```

SizeChangedEventArgs

```
namespace System.Windows
{
    public class SizeChangedEventArgs : RoutedEventArgs
    {
        public SizeChangedEventArgs( );
        public SizeChangedEventArgs(SizeChangedInfo info);
        public Size PreviousSize { get; }
        public Size NewSize { get; }
        public bool WidthChanged { get; }
        public bool HeightChanged { get; }
        protected override void InvokeEventHandler(Delegate genericHandler, object genericTarget);
    }
}
```

Public SizeChangedEventArgs( );
  Default constructor.

Public SizeChangedEventArgs (SizeChangedInfo Info);
  Overload constructor which takes all arguments required to build a SizeChangedEventArgs since all properties are read-only.

Public Size PreviousSize {Get;}
  Size before size change.

Public Size NewSize {Get;}
  Size after size change.

Public Bool WidthChanged {Get;}
  Indicates whether or not the width changed.

Public Bool HeightChanged {Get;}
  Indicates whether or not the height changed.

Methods

Protected Override Void InvokeEventHandler(Delegate GenericHandler, Object GenericTarget);

SizeChangedInfo

```
namespace System.Windows
{
    public class SizechangedInfo
    {
        public SizeChangedInfo( );
        public SizeChangedInfo(UIElement element, Size previousSize,
Size newSize, bool widthChanged, bool heightChanged)
        public Size PreviousSize { get; }
        public Size NewSize { get; }
        public bool WidthChanged { get; }
        public bool HeightChanged { get; }
    }
}
```

Methods

Public SizeChangedInfo( );
  Default constructor.

Public SizeChangeInfo(UIElement Element, Size PreviousSize, Size NewSize, Bool WidthChanged, Bool HeightChanged)
  Overload constructor which takes all arguments required to build a SizeChangedInfo since all properties are read-only.

Properties

Public Size PreviousSize {Get;}
  Size before size change.

Public Size NewSize {Get;}
  Size after size change.

Public Bool WidthChanged {Get;}
  Indicates whether or not the width changed.

Public Bool HeightChanged {Get;}
  Indicates whether or not the height changed.

CONCLUSION

As can be seen from the foregoing detailed description, there is described a method and system that provide consistent and uniform handling of user interface elements. The layout system is straightforward for developers to use, and is extensible to handle other layout needs.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing system having a parser and a renderer, a method for a layout system that is interposed between the parser and the renderer to manage sizes and positions for user interface elements, the method comprising:
  at a layout system that is interposed between the parser and the renderer of the computing system, receiving a measure call from a parent user interface element directed towards a child user interface element, wherein the layout system comprises a protocol and associated application programming interface, and wherein the parent and child user interface elements are elements of an element tree, wherein the measure call specifies the size available in a user interface to display content of the child user interface element;
  upon the layout system receiving the available size, processing the available size based on property information associated with the child user interface element to generate a modified available size, the modified available size corresponding to a policy;
  providing the modified available size to the child user interface element;
  in response to providing the modified available size to the child user interface element, receiving from the child user interface element a desired size, wherein the desired size specifies a size in which the child user interface element desires to display content;
  upon the layout system determining that the desired size exceeds the modified available size, modifying the desired size to correspond to the modified available size, and returning the modified desired size to the parent user interface element, and wherein the layout system retains the desired size;
  receiving at the layout system an arrange call from the parent user interface element directed towards the child user interface element, the arrange call including a region size that specifies a region of the user interface in which the content of the child user interface element will be arranged, the arrange call further including position data that specifies the alignment with which content of the child user interface element will be displayed within the region;
  upon the layout system receiving the arrange call, determining that the retained desired size requested by the child user interface element exceeds the region size;
  in response to determining that the desired size exceeds the region size, providing the desired size rather than the region size to the child user interface element as the size in which the content of the child user interface element will be arranged;
  in response to providing the desired size, receiving a rendering size from the child user interface element; and
  upon determining that the rendering size exceeds the region size, applying the position data to modify content associated with the child user interface element such that the content fits within the region such that the content of the child user interface element is aligned for output in the region based on the property information associated with the child user interface element and the available size.

2. The method of claim 1 wherein applying the position data to modify content associated with the child user interface element comprises clipping the content of the child user interface element to fit in the region.

3. The method of claim 1 wherein applying the position data to modify content associated with the child user interface element comprises handling any vertical and horizontal offsets at the layout system based on the position data.

4. The method of claim 1 wherein processing the available size based on property information associated with the child user interface element to generate a modified available size comprises adjusting the available size for at least one margin.

5. The method of claim 1 wherein applying the position data to modify content associated with the child user interface comprises applying a stretch-based alignment.

6. The method of claim 1 wherein the property information comprises VerticalAlignment, HorizontalAlignment, Height, Width, MinWidth, MaxWidth, MinHeight, MaxHeight, Margin, and FlowDirection.

7. The method of claim 6 wherein the layout system assigns the values of ActualHeight and ActualWidth based on the desired size data received from the child user interface element.

8. At least one computer storage medium having stored computer-executable instructions, which when executed perform a method for a layout system that is interposed between a parser and a renderer of a computing system to manage sizes and positions for user interface elements, the method comprising:
at a layout system that is interposed between the parser and the renderer of the computing system, the layout system comprising a protocol and associated application programming interface:
at a layout system that is interposed between the parser and the renderer of the computing system, receiving a measure call from a parent user interface element directed towards a child user interface element, wherein the layout system comprises a protocol and associated application programming interface, and wherein the parent and child user interface elements are elements of an element tree, wherein the measure call specifies the size available in a user interface to display content of the child user interface element;
upon the layout system receiving the available size, processing the available size based on property information associated with the child user interface element to generate a modified available size, the modified available size corresponding to a policy;
providing the modified available size to the child user interface element;
in response to providing the modified available size to the child user interface element, receiving from the child user interface element a desired size, wherein the desired size specifies a size in which the child user interface element desires to display content;
upon the layout system determining that the desired size exceeds the modified available size, modifying the desired size to correspond to the modified available size, and returning the modified desired size to the parent user interface element, and wherein the layout system retains the desired size;
receiving at the layout system an arrange call from the parent user interface element directed towards the child user interface element, the arrange call including a region size that specifies a region of the user interface in which the content of the child user interface element will be arranged, the arrange call further including position data that specifies the alignment with which content of the child user interface element will be displayed within the region;
upon the layout system receiving the arrange call, determining that the retained desired size; requested by the child user interface element exceeds the region size;
in response to determining that the desired size exceeds the region size, providing the desired size rather than the region size to the child user interface element as the size in which the content of the child user interface element will be arranged;
in response to providing the desired size, receiving a rendering size from the child user interface element; and
upon determining that the rendering size exceeds the region size, applying the position data to modify content associated with the child user interface element such that the content fits within the region such that the content of the child user interface element is aligned for output in the region based on the property information associated with the child user interface element and the available size.

9. The computer storage medium of claim 8 wherein applying the position data to modify content associated with the child user interface element comprises handling any vertical and horizontal offsets at the layout system based on the position data.

10. The computer storage medium of claim 8 wherein processing the available size based on property information associated with the child user interface element to generate a modified available size comprises adjusting the available size for at least one margin.

11. The computer storage medium of claim 10 wherein modifying the desired size to correspond to the modified available size, and returning the modified desired size to the parent user interface element comprises computing the modified desired size based on the desired size and at least one margin.

12. The computer storage medium of claim 8 wherein applying the position data to modify content associated with the child user interface element comprises determining an alignment of the content to be rendered in the region, and clipping the content to fit the region, with the content aligned based on the determined alignment of content.

13. The computer storage medium of claim 12 wherein determining an alignment of the content comprises evaluating at least one property value of the property information associated with the child user interface element.

14. The computer storage medium of claim 13 wherein the determined alignment of content comprises stretch.

15. In a computing environment, a system having a layout system interposed between a parser and a renderer, the layout system managing sizes and positions for user interface elements, the system comprising:
a processor; and
memory storing instructions which when executed by the processor perform a method comprising:
at a layout system that is interposed between the parser and the renderer of the computing system, receiving a measure call from a parent user interface element directed towards a child user interface element, wherein the layout system comprises a protocol and associated application programming interface, and wherein the parent and child user interface elements are elements of an element tree, wherein the measure call specifies the size available in a user interface to display content of the child user interface element;

upon the layout system receiving the available size, processing the available size based on property information associated with the child user interface element to generate a modified available size, the modified available size corresponding to a policy;

providing the modified available size to the child user interface element;

in response to providing the modified available size to the child user interface element, receiving from the child user interface element a desired size, wherein the desired size specifies a size in which the child user interface element desires to display content;

upon the layout system determining that the desired size exceeds the modified available size, modifying the desired size to correspond to the modified available size, and returning the modified desired size to the parent user interface element, and wherein the layout system retains the desired size;

receiving at the layout system an arrange call from the parent user interface element directed towards the child user interface element, the arrange call including a region size that specifies a region of the user interface in which the content of the child user interface element will be arranged, the arrange call further including position data that specifies the alignment with which content of the child user interface element will be displayed within the region;

upon the layout system receiving the arrange call, determining that the retained desired size requested by the child user interface element exceeds the region size;

in response to determining that the desired size exceeds the region size, providing the desired size rather than the region size to the child user interface element as the size in which the content of the child user interface element will be arranged;

in response to providing the desired size, receiving a rendering size from the child user interface element; and upon determining that the rendering size exceeds the region size, applying the position data to modify content associated with the child user interface element such that the content fits within the region such that the content of the child user interface element is aligned for output in the region based on the property information associated with the child user interface element and the available size.

16. The system of claim 15 wherein applying the position data to modify content associated with the child user interface element comprises clipping the content to fit in the region after adjusting the rendering size for at least one margin.

17. The system of claim 16 wherein clipping the content comprises accessing the property information associated with the child user interface element to determine an alignment for the clipped content.

18. The system of claim 15 wherein the layout subsystem comprises a core component and a framework component.

19. The system of claim 15 wherein the parent user interface element comprises a container in an element tree.

\* \* \* \* \*

UNITED STATES PATENT AND TRADEMARK OFFICE
CERTIFICATE OF CORRECTION

| | | |
|---|---|---|
| PATENT NO. | : 7,516,400 B2 | Page 1 of 1 |
| APPLICATION NO. | : 11/074476 | |
| DATED | : April 7, 2009 | |
| INVENTOR(S) | : Oleg V. Ovetchkine et al. | |

It is certified that error appears in the above-identified patent and that said Letters Patent is hereby corrected as shown below:

In column 26, line 8, in Claim 8, delete "size;" and insert -- size --, therefor.

Signed and Sealed this
Tenth Day of May, 2011

David J. Kappos
*Director of the United States Patent and Trademark Office*